Nov. 8, 1932.   C. E. PINK   1,887,425
REENFORCEMENT FOR CONVEYER BELTS
Filed Feb. 20, 1932
Fig.1.
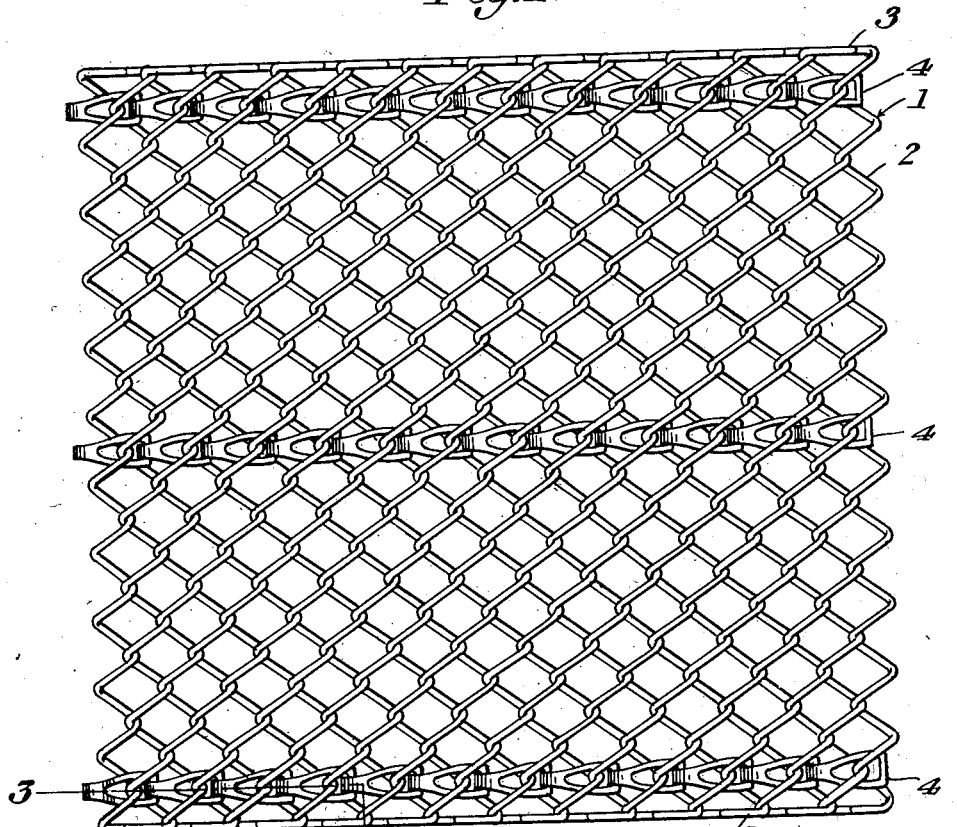
Fig.2.
Fig.3.
Fig.4.
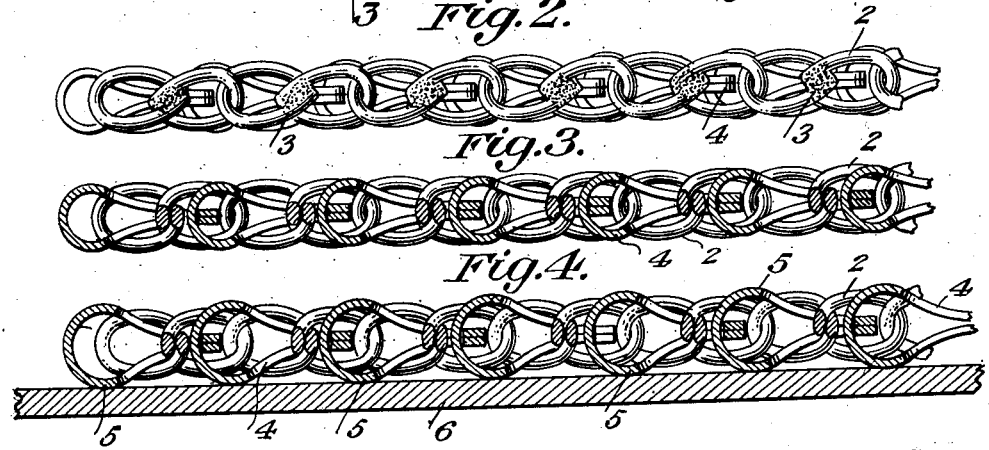
Clarence E. Pink
INVENTOR
BY Victor J. Evans & Co.
ATTORNEYS Patented Nov. 8, 1932

1,887,425

UNITED STATES PATENT OFFICE

CLARENCE E. PINK, OF CAMBRIDGE, MARYLAND

REENFORCEMENT FOR CONVEYER BELTS

Application filed February 20, 1932. Serial No. 594,360.

This invention relates to a conveyer belt of the type constructed from spirally formed and interwoven wires or members providing a flexible belt fabric having diagonally extending surface engaging ribs with the ends of the wires suitably connected to provide selvages at the side edges of the fabric and has for the primary object, the provision of means woven within the fabric to strengthen the latter for withstanding internal strains and for preventing undue elongating of the fabric both as to width and length thereof and to protect the fabric against tears due to wear to the selvages.

Another object of this invention is the provision of strengthening and protecting flexible elements formed of connected links woven within the belt fabric at suitable intervals and extending longitudinally thereof to resist internal belt strains and to protect the fabric from selvage tears and capable of relieving the fabric from driving or operating strains.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a fragmentary plan view illustrating a reenforcement for woven wire conveyer belts constructed in accordance with my invention.

Figure 2 is a fragmentary edge elevation illustrating the same.

Figure 3 is a sectional view taken on the line 3—3 of Figure 1 showing spirally formed wires extending through the links of the flexible reenforcing element.

Figure 4 is a similar view showing a modification wherein the links of the flexible element project beyond the surfaces of the fabric to relieve said surfaces of wear and driving strains.

Referring in detail to the drawing, the numeral 1 indicates a fragmentary portion of a conveyer belt constructed from a plurality of transversely arranged and spirally formed and interwoven wires or members 2 providing a flexible belt fabric. The ends of pairs of wires 2 are bent toward each other and suitably attached to form the fabric with side selvages 3. The spirally formed wires form in the fabric diagonally extending ribs as clearly shown in Figure 1 adapted to have contact with the belt supporting mediums and also articles carried by the belt.

Belts of this character usually are manufactured or constructed of considerable lengths and widths and used in many industries for conveying articles or materials from one place to another and in certain industries they are employed for conveying materials through driers and after leaving the driers are subjected to beaters for removing therefrom dried materials which adhere thereto and fail to become separated by the ordinary movement of the belt. The beaters acting upon the belt subject the same to severe wear principally adjacent the selvages 3 causing the latter to tear or break rendering the belt unfit for further use until repaired and which repairs materially increase the cost of maintenance of the belt and to overcome these objections and others I have provided reenforcement to the fabric of the belt at desired intervals to strengthen the fabric and resist internal strains and also to prevent selvage tears from extending into the fabric. Any number of reenforcements may be provided for the fabric of the belt and are arranged to extend longitudinally of the belt with the spirally formed wires woven therethrough which prevents the fabric of the belt from undue elongating both as to width and length. The reeforcements are preferably located within the fabric adjacent to the selvages 3 so that should the selvages become torn parting certain connected wires from each other, the tears thus formed will be prevented from extending into the fabric beyond the reenforcement. As shown in Figure 1 the fabric may be reenforced other than at points adjacent the selvages.

Each reenforcement consists of interconnected chain links 4 having the pairs of connected wires passed through the openings of the links and where the coiled or spirally formed wires engage each other thereby efficiently anchoring the links within the fabric or to the pairs of spirally formed wires. The links 4 may be either constructed with flat faces or of any other design desirable and as shown in Figure 4 the links may be of such size that the faces 5 thereof project beyond the spiral ribs formed within the fabric so that the ribs are prevented from contacting with the belt support 6 relieving the ribs or spiral wires of the fabric from unnecessary frictional wear. The faces 5 contacting with the driving medium of the belt assume the driving forces and prevent such forces from acting directly on the wires of the fabric which increases the life of the fabric. Internal strains within the fabric are also taken up by the links.

The reenforcements being of chain or link formation permit the fabric to still retain its flexibility and also the reenforcements may be constructed of tempered metal capable of withstanding greater strains than the material of the wires and as the reenforcements assume the driving or operating strains and the internal strains within the fabric, a belt of this construction will be capable of lasting a greater length of time and thereby reduce to a minimum the operating costs thereof.

While I have shown and described the preferred embodiment of my invention, it will be understood that minor changes in construction, combination and arrangement of parts may be made without departing from the spirit and scope of my invention, as claimed.

Having thus described my invention, what I claim is:

1. A conveyer belt comprising a plurality of spirally formed and interwoven wires providing a flexible belt fabric, and flexible reenforcements having the wires woven therethrough and extending longitudinally of the belt fabric.

2. A conveyer belt comprising a plurality of spirally formed and interwoven wires providing a flexible belt fabric, selvages formed at the side edges of the fabric by connecting the ends of the wires, and flexible reenforcements interwoven within the fabric at spaced intervals and adjacent the selvages by having the wires passing therethrough.

3. A conveyer belt comprising a plurality of spirally formed and interwoven wires providing a flexible belt fabric and forming in said fabric diagonally extending surface engaging ribs, selvages formed at the side edges of the fabric by connecting the ends of the wires, and flexible reenforcements woven in the fabric at spaced intervals and adjacent the selvages and extending longitudinally of the fabric and projecting beyond the ribs to prevent the latter from having frictional contact with supporting mediums.

4. A conveyer belt comprising a plurality of spirally formed and interwoven wires providing a flexible belt fabric with the wires extending transversely thereof, selvages formed at the side edges of the fabric by connecting the ends of the wires, and flexible reenforcements of interconnected link construction woven within the fabric and extending longitudinally thereof and located at spaced intervals to each other and adjacent the selvages by having the wires passing through the links where said wires engage each other.

5. A conveyer belt comprising a plurality of spirally formed and interwoven wires providing a flexible belt fabric having diagonally extending surface ribs, selvages arranged at the side edges of the fabric and formed by connecting the ends of the wires, and flexible reenforcements interwoven in the fabric and extending longitudinally thereof and arranged in spaced relation to each other and adjacent the selvages by having the wires passed through the links where said wires engage each other, the links of said reenforcements projecting beyond the ribs to prevent the latter from contacting with supporting and driving mediums for the fabric.

6. A conveyer belt comprising a plurality of spirally formed and interwoven wires providing a flexible belt fabric having diagonally extending surface ribs, selvages arranged at the side edges of the fabric and formed by connecting the ends of the wires, chains interwoven within the fabric and extending longitudinally thereof at spaced intervals and adjacent the selvages and each including interconnected links with the wires extending through said links where said wires engage each other, said links having bearing surfaces arranged in planes outwardly of the ribs.

In testimony whereof I affix my signature.
CLARENCE E. PINK.